(12) United States Patent
Joukov (10) Patent No.: US 8,862,689 B2
(45) Date of Patent: Oct. 14, 2014

(54) LOCAL FLASH MEMORY AND REMOTE SERVER HYBRID CONTINUOUS DATA PROTECTION

(75) Inventor: Nikolai Joukov, Hawthorne, NY (US)

(73) Assignee: International Business Machines Corporation, Armonk, NY (US)

( * ) Notice: Subject to any disclaimer, the term of this patent is extended or adjusted under 35 U.S.C. 154(b) by 1504 days.

(21) Appl. No.: 11/877,931

(22) Filed: Oct. 24, 2007

(65) Prior Publication Data

US 2009/0109823 A1    Apr. 30, 2009

(51) Int. Cl.
G06F 15/16 (2006.01)
G06F 11/14 (2006.01)
G06F 12/08 (2006.01)

(52) U.S. Cl.
CPC ........ *G06F 11/1451* (2013.01); *G06F 11/1456* (2013.01); *G06F 11/1464* (2013.01); *G06F 12/0866* (2013.01); *H05K 999/99* (2013.01)
USPC .......................................... 709/217; 709/224

(58) Field of Classification Search
CPC ........ G06F 11/00; G06F 12/00; H05K 999/00
USPC .......................................... 709/217, 224–225
See application file for complete search history.

(56) References Cited

U.S. PATENT DOCUMENTS

| | | | |
|---|---|---|---|
| 6,105,138 A * | 8/2000 | Arakawa et al. | 713/300 |
| 6,324,654 B1 * | 11/2001 | Wahl et al. | 714/6.12 |
| 6,748,403 B1 * | 6/2004 | Lemke | 1/1 |
| 7,069,351 B2 | 6/2006 | Chung | |
| 7,315,965 B2 * | 1/2008 | Stager et al. | 714/42 |
| 7,366,861 B2 | 4/2008 | Manchester et al. | |
| 7,389,379 B1 | 6/2008 | Goel et al. | |
| 7,454,443 B2 * | 11/2008 | Ram et al. | 1/1 |

(Continued)

FOREIGN PATENT DOCUMENTS

| | | |
|---|---|---|
| JP | 07262074 | 10/1995 |
| JP | 2000137636 A | 5/2000 |

(Continued)

OTHER PUBLICATIONS

Doan, Notice of Allowance and Fee(s) Due for U.S. Appl. No. 11/877,947 dated Apr. 11, 2011, 23 pages.

(Continued)

*Primary Examiner* — Thu Nguyen
*Assistant Examiner* — Ebrahim Golabbakhsh
(74) *Attorney, Agent, or Firm* — Louis J. Percello; Hoffman Warnick LLC (57) ABSTRACT

The present invention provides a way to use flash memory to keep backup copies of the recently modified data. The recently modified data is stored on a local hard drive and replicated (usually with versions) on a local flash drive when the network connectivity does not exist or not sufficient. As soon as the network connectivity is established the accumulated data is sent to the remote CDP server and the whole space of the flash drive can be reused again. As a result, the data is always replicated: one data copy is stored on the hard drive and the other copy is stored (usually with versions) either on a remote server or a local flash drive. Therefore, the combination of the data on the CDP server and the flash drive can be used to reconstruct the data stored on the hard drive.

18 Claims, 5 Drawing Sheets

(56) References Cited

U.S. PATENT DOCUMENTS

| | | |
|---|---|---|
| 7,523,149 B1 * | 4/2009 | Sridharan et al. ............. 1/1 |
| 7,620,773 B2 | 11/2009 | Nicholson et al. |
| 2003/0233525 A1 * | 12/2003 | Reeves .................. 711/162 |
| 2004/0010628 A1 * | 1/2004 | Gillam et al. ............. 709/250 |
| 2004/0153694 A1 | 8/2004 | Nicholson et al. |
| 2004/0210938 A1 * | 10/2004 | Eckenroth et al. ........... 725/107 |
| 2005/0050106 A1 * | 3/2005 | Wenner et al. ............. 707/200 |
| 2005/0086655 A1 * | 4/2005 | Aguilar et al. ............. 717/176 |
| 2005/0171979 A1 * | 8/2005 | Stager et al. ............. 707/200 |
| 2005/0273858 A1 * | 12/2005 | Zadok et al. ............... 726/24 |
| 2006/0051157 A1 * | 3/2006 | Bornstein et al. ............ 401/206 |
| 2006/0053347 A1 | 3/2006 | van Ingen et al. |
| 2007/0028139 A1 | 2/2007 | Wahl et al. |
| 2007/0033356 A1 | 2/2007 | Erlikhman |
| 2007/0130255 A1 * | 6/2007 | Wolovitz et al. ............. 709/204 |
| 2007/0136397 A1 | 6/2007 | Pragada et al. |
| 2007/0168518 A1 | 7/2007 | McCabe et al. |
| 2007/0239952 A1 * | 10/2007 | Hwang et al. ............. 711/162 |
| 2008/0034019 A1 * | 2/2008 | Cisler et al. ............... 707/204 |
| 2008/0140901 A1 | 6/2008 | Corrion |
| 2008/0144601 A1 * | 6/2008 | Nurminen et al. ........... 370/350 |
| 2008/0248779 A1 * | 10/2008 | Tsui et al. ................... 455/408 |

FOREIGN PATENT DOCUMENTS

| | | |
|---|---|---|
| JP | 2003186627 A | 7/2003 |
| JP | 2004148596 A | 6/2004 |
| JP | 2005107805 A | 4/2005 |

OTHER PUBLICATIONS

Patent Cooperation Treaty, Notification of Transmittal of Internatuional Preliminary Report on Patentability for PCT No. PCT/US08/77152 dated Jul. 18, 2010, 9 pages.

Patent Cooperation Treaty, Notification of Transmittal of International Preliminary Report on Patentability for PCT No. PCT/US08/77154 dated Jul. 24, 2010, 10 pages.

Young, "PCT Notification of Transmittal of the International Search Report and the Written Opinion of the International Searching Authority, or the Declaration," Dec. 4, 2008, 8 pages.

Zadok et al., "A Stackable File System Interface for Linux," LinuxExpo Conference Proceedings, http://www.fsl.cs.sunysb.edu/docs/linux-stacking/linux.pdf, May 1999, pp. 1-10.

Young, "PCT Notification of Transmittal of the International Search Report and the Written Opinion of the International Searching Authority, or the Declaration," for PCT/US2008/77154, dated Dec. 9, 2008, 9 pages.

Doan, Office Communication for U.S. Appl. No. 11/877,947 dated Feb. 1, 2010, 24 pages.

Doan, Office Communication for U.S. Appl. No. 11/877,947 dated Jul. 9, 2010, 19 pages.

* cited by examiner

Figure 1A  A Possible Stackable-File-System-Based Implementation

LOCAL FLASH MEMORY AND REMOTE SERVER HYBRID CONTINUOUS DATA PROTECTION

CROSS-REFERENCE TO RELATED APPLICATIONS

This patent application is related to a patent application filed concurrently herewith, U.S. patent application Ser. No. 11/877,947, entitled SYSTEM AND METHOD FOR USING REVERSED BACKUP OPERATION FOR MINIMIZING THE DISK SPINNING TIME AND THE NUMBER OF SPIN-UP OPERATIONS, now U.S. Pat. No. 8,037,240.

BACKGROUND OF THE INVENTION

1. Field of the Invention

The present invention generally relates to continuous data protection and, more specifically, the present invention provides a system and method for utilizing local flash memory and a remote server for continuous data protection.

2. Related Art

Hard disks are fragile, have limited life-time, and their failure can make the stored precious data inaccessible. Most existing backup solutions create data copies periodically, leaving the recently created or modified data unprotected before the next backup time. Continuous Data Protection (CDP) systems attempt to solve this problem by creating remote copies of the data every time the data is saved to the disk (e.g., Tivoli® CDP). (Continuous data protection (CDP), also called continuous backup, refers to backup of computer data by automatically saving a copy of every change made to that data, essentially capturing every version of the data that the user saves. It allows the user or administrator to restore data to any point in time. CDP is a service that captures changes to data to a separate storage location. There are multiple methods for capturing the continuous changes involving different technologies that serve different needs. CDP-based solutions can provide fine granularities of restorable objects ranging from crash-consistent images to logical objects such as files, mail boxes, messages, and database files and logs.) IBM's Tivoli® Continuous Data Protection for Files is an integrated recovery solution that provides complete data protection in case of a corruption, user error, virus, or system failure. It installs and configures in minutes, and runs invisible in the background. For more information on IBM's Tivoli® Continuous Data Protection for Files, see http://www-306.ibm.com/software/tivoli/resource-center/storage/cdp.jsp?S_TACT=104CB62&ca=104CB627.

Unfortunately, existing CDP systems create backup copies on the remote servers and do not protect the data when the network connection is unavailable, which is the common case for mobile users. Some CDP systems (e.g., SonicWALL® CDP—for more information on SonicWALL CDP, see http://www.sonicwall.com/us/backup_and_recovery.html) replicate the data on a redundant local hard drive. Unfortunately, this option is also not convenient for mobile users because the hard drives are bulky and consume extra power from the batteries.

Flash memory has become cheaper, bigger, and faster. (Flash memory is non-volatile computer memory that can be electrically erased and reprogrammed. It is a technology that is primarily used in memory cards, and USB flash drives (thumb drives, handy drive, memory stick, flash stick, jump drive) for general storage and transfer of data between computers and other digital products. It is a specific type of EEPROM that is erased and programmed in large blocks; in early flash the entire chip had to be erased at once. Flash memory costs far less than byte-programmable EEPROM and therefore has become the dominant technology wherever a significant amount of non-volatile, solid-state storage is needed. (For more information on flash memory, see http://electronics.howstuffworks.com/flash-memory.htm.)) As a result, it is now used for purposes other than removable drives. Hybrid drives contain flash memory to store recent writes before they are committed to the disk platters. (A hybrid drive, a.k.a. Hybrid Hard Drive (HHD), is a type of large-buffer computer hard disk drive. It is different from standard hard drives in that it employs a large buffer (up to 1 GB) of non-volatile flash memory to cache data during normal use. By primarily using this large buffer for non-volatile data storage, the platters of the hard drive are at rest almost all of the time, instead of constantly spinning as they are in current hard drives. This offers numerous benefits, chief among them speed, decreased power consumption, improved reliability, and a faster boot process. For more information on HHDs, see http://www.engadget.com/tag/hhd.) However, hybrid drives do not provide CDP because (1) the data is stored only in the flash memory before it is committed to the disk and (2) the data in the flash memory can be overwritten right after that. However, flash memory provides several benefits: (1) hybrid drives can save power because they can save some written data in the flash memory and thus postpone hard disks' spin-up operations if their platters are not spinning; and (2) flash memory has constant and small data access times. Therefore, hybrid disks and Windows® Vista's ReadyBoost use flash memory to serve random read requests to improve performance. (ReadyBoost is a disk caching technology first included with Microsoft's Windows Vista operating system. It aims to make computers running Windows Vista more responsive by using flash memory on a USB 2.0 drive, SD card, CompactFlash, or other form of flash memory, in order to boost system performance).

Therefore, there exists a need for a solution that solves at least one of the deficiencies of the related art.

SUMMARY OF THE INVENTION

In general, the present invention provides a way to use flash memory (such as USB thumb drives) to keep backup copies of the recently modified data. The recently modified data is stored on a local hard drive and replicated (usually with versions) on a local flash drive when the network connectivity does not exist or not sufficient. As soon as the network connectivity is established the accumulated data is sent to the remote CDP server and the whole space of the flash drive can be reused again. As a result, the data is always replicated: one data copy is stored on the hard drive and the other copy is stored (usually with versions) either on a remote server or a local flash drive. Therefore, the combination of the data on the CDP server and the flash drive can be used to reconstruct the data stored on the hard drive.

This invention provides the following benefits:
1. CDP at all times—even when the network connectivity is unavailable;
2. negligible extra power consumption, which is important for mobile users;
3. the flash drive can be removed and conveniently stored separately from the backed up system (e.g., in a pocket). This way, even if the main system and its storage are stolen or damaged the flash drive still contains the data not stored on the remote CDP server;

4. existing and future flash drives can be added to existing systems and easily upgraded; and 5. the same flash drive and the same software package can be potentially concurrently used to conserve disk power (similar to hybrid drives) and to improve random access performance (similar to Windows Vista's ReadyBoost).

The present invention also provides related methods and/or program products. Such methods and program products would for utilizing local flash memory and a remote server for continuous data protection.

BRIEF DESCRIPTION OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE DRAWINGS

The present invention provides a way for utilizing local flash memory and a remote server, which may be, but doesn't need to be, a remote server hybrid, for continuous data protection.

This invention can be implemented at any of the three logical levels: (1) device, (2) block driver, and (3) file system. In the case where the present invention uses hybrid drives, hybrid drives can be modified to use their flash memory to keep a backup copy of the most recently written data blocks and data versions. Again, it is stressed that the present invention does not require the use of remote server hybrids but can if desired. To commit data buffers to a remote server, hybrid drives may need support from a special block driver. Complete block-driver-level solution can be implemented as a stackable device driver that interacts with the hard disk driver (242 in FIG. 2), flash disk device driver (244 in FIG. 2), and a network protocol implementation (246 in FIG. 2) used to communicate with the server (CDP Server 104B in FIG. 1B). Similarly, a stackable file system (also known as filter driver file system on Windows) can use two disk-based file systems (one for the hard disk and the other for the flash drive) and a network file system to write the data to a remote server. Both driver-level and file-system-level solutions have the advantage that the flash drive (240 in FIG. 2) is separate from the hard disk drive (218 in FIG. 2). This allows the use of any existing hard disks (218 in FIG. 2) and flash drives (240 in FIG. 2), the ability to upgrade them independently, and to keep them in physically different locations when not in use to improve survivability. Also, device-level implementation requires hardware changes and a new API to communicate with the modified drives. Therefore, the device-level implementation is not considered further here.

Figure 3A:
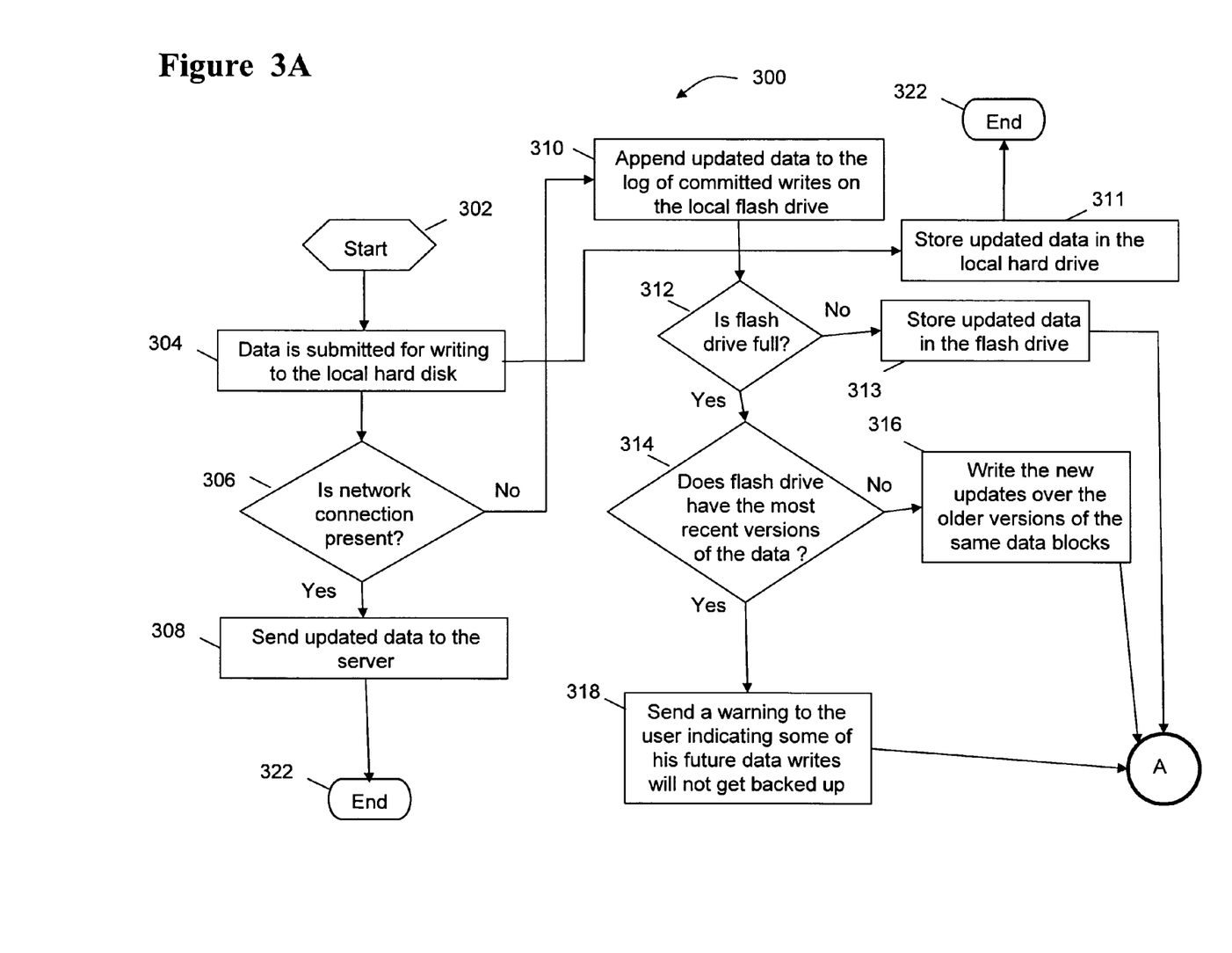
FIG. 3A shows an illustrative embodiment of the method of the present invention.
Figure 3B:
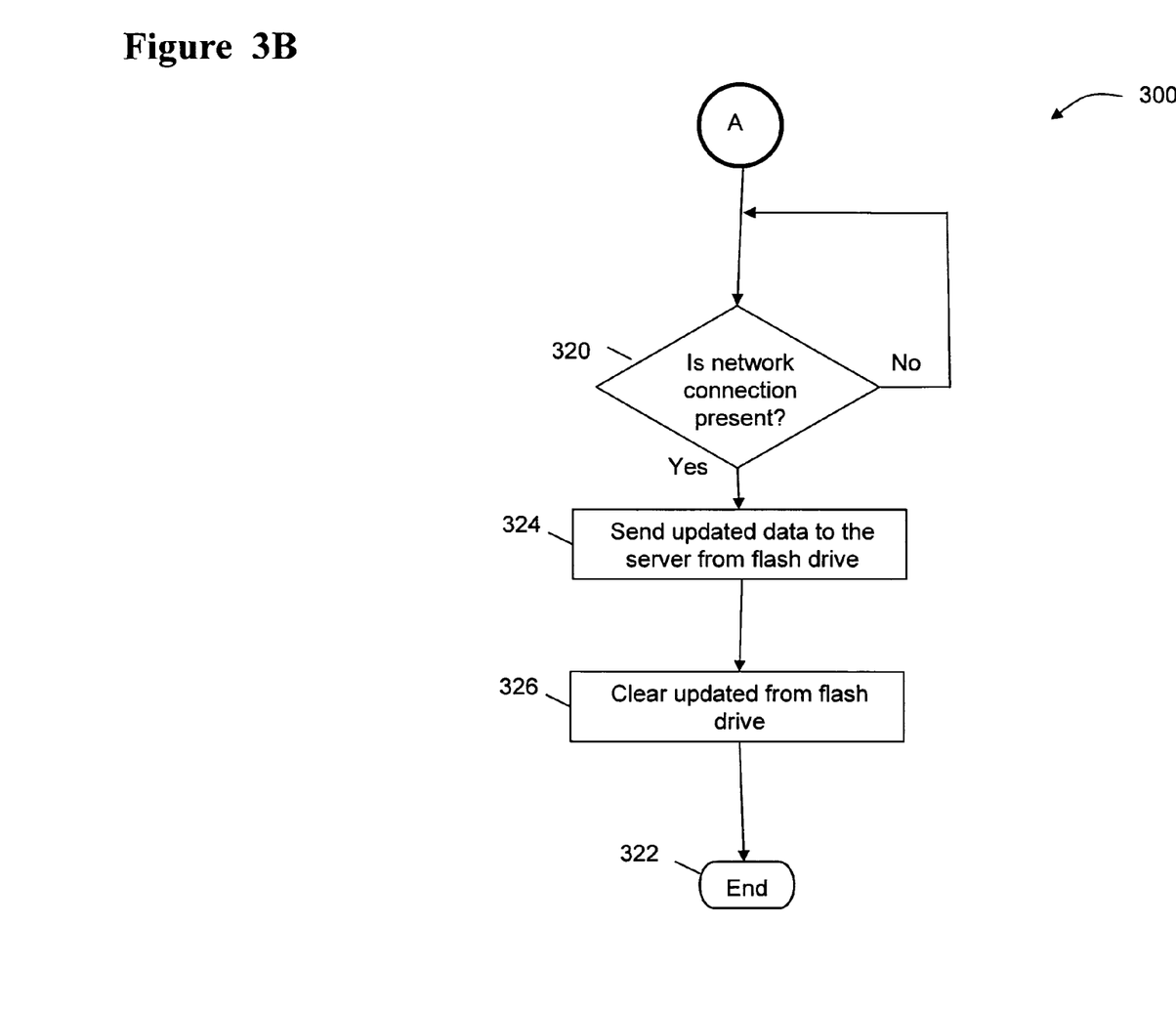
FIG. 3B shows a continuation of the method of the present invention where the beginning of the method is illustrated in FIG. 3A.

Both stackable device and file system implementations operate as follows upon every write request. As shown in FIG. 3A, the process 300 begins at step 302 and, at step 304, the updated data is submitted for writing to the local hard disk. At step 311, the updated data is stored on the local hard drive and the process ends at 322. Concurrently, at step 306, it is determined whether a network connection is present. If so, at step 308, the updated data is sent to the server for backup and the process ends at 322. If not, at step 310, the updated data is appended to the log of committed writes on the local flash drive. At step 312, it is determined whether the flash drive is full. If not, the updated data is stored in the flash drive at step 313 and the process is continued at A shown in FIG. 3B. If the flash drive is full, at step 314, it is determined whether the most recent versions of the data are stored in the flash drive. If not, at step 316, the new updates are written over the older versions of the same data blocks written to the log earlier and the process is continued at A shown in FIG. 3B. If the flash drive is full and contains only the most recent versions of the data, at step 318, a warning is sent to the user indicating some of his future data writes will not get backed up and the process at A continues as shown in FIG. 3B. At this point, the user may stop working, initiate a backup to a local DVD media, replace the flash drive with a spare one, or continue working taking the risk of a potential loss of some of the recent data updates in case of the hard disk drive failure. Fortunately, modern flash memory drives can keep gigabytes of data, which is sufficient to keep thousands of files, such as Microsoft Power Point Presentation files or Microsoft Word documents. Therefore, most users will never run out of the flash memory log space before two intervals of the network connection availability (at which point, the flash memory contents are copied to the remote server). The process continues at A as shown in FIG. 3B. At 320, it is determined whether the network is present, and if not, it continuously checks for the network to be present. If so, the updated data is sent to the server from the flash drive for backup at step 324 and, at step 326, the updated data is cleared from the flash drive and the process ends at 322.

Figure 1A:
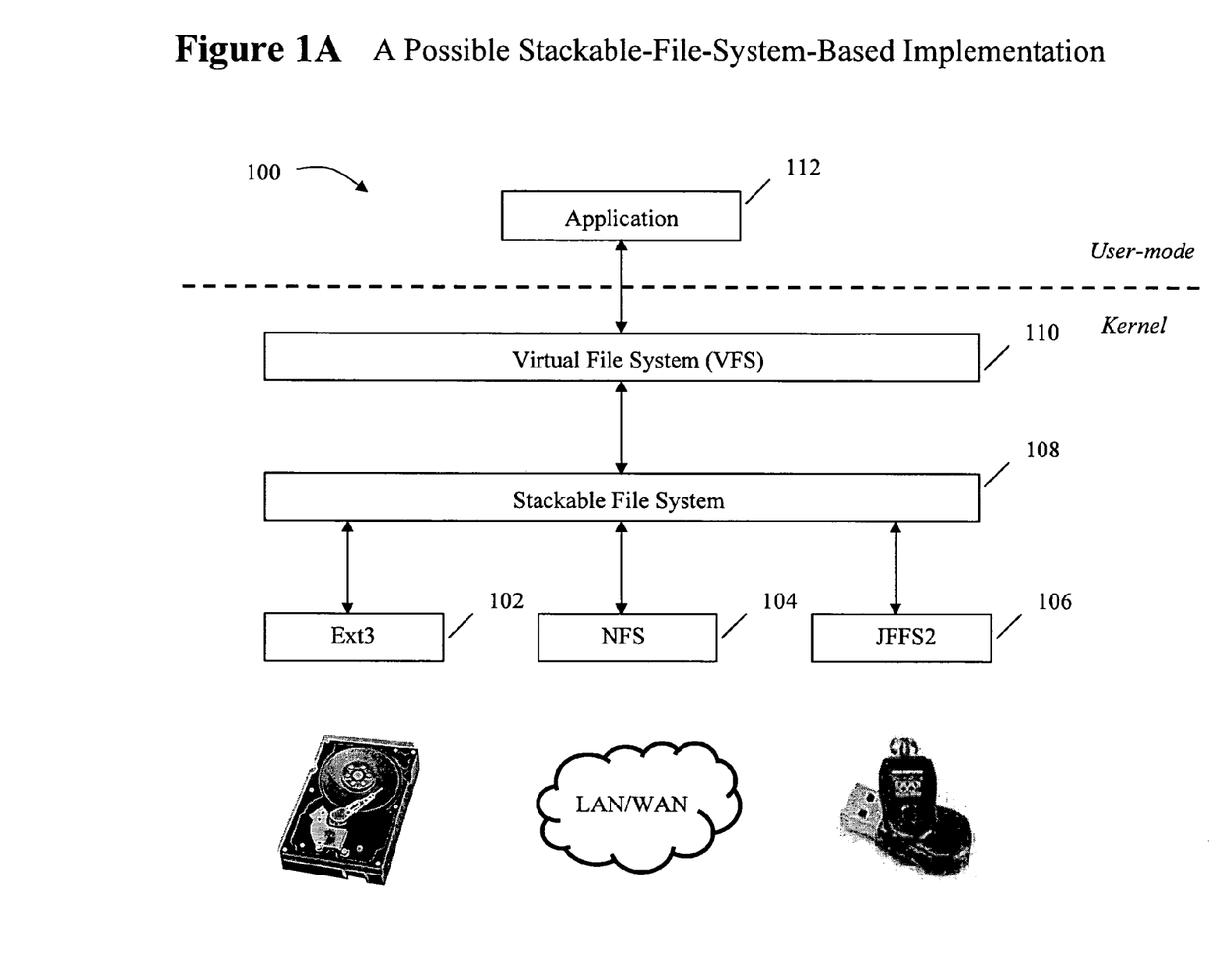
FIG. 1A shows a possible stackable-file-system-based implementation according to the present invention.

On one hand, a stackable driver-level implementation allows more customizations and optimizations than a file-system-level implementation. For example, a stackable driver-level implementation may contain a custom implementation of the log for the flash drive. A possible implementation of a stackable file system based implementation 100 is shown in FIG. 1A.

On the other hand, a stackable file system allows better code reuse of already developed and supported file systems. For example, a stackable file system 108 can use existing (and independently maintained) file systems designed for flash drives (e.g., JFFS2) 106 and network file systems (e.g., NFS or CIFS) 104. (The Journaling Flash File System version 2 or JFFS2 is a log-structured file system for use in flash memory devices. It is the successor to JFFS. JFFS2 has been included in the Linux kernel since the 2.4.10 release. JFFS2 is also available for the eCos RTOS and RedBoot bootloader. Network File System (NFS) is a network file system protocol originally developed by Sun Microsystems in 1984, allowing a user on a client computer to access files over a network as easily as if the network devices were attached to its local disks. Common Internet File System (CIFS) is an application-level network protocol mainly applied to shared access to files, printers, serial ports, and miscellaneous communications between nodes on a network. It also provides an authenticated Inter-process communication mechanism. It is mainly used by Microsoft Windows equipped computers, where it's known simply as "Microsoft Windows Network"). This makes stackable file systems simple to support and develop. In addition, stackable file systems are file systems and have access to meta-information such as file location and name. This allows the system to support different backup policies for different files. Thus, some files may be more important and can be backed up with versions, less important files may be backed up without versions and files which can be regenerated require no back up at all. An additional benefit of the file system implementation is the operation above file system page cache. This allows faster transfer of the data from the flash memory to the remote server because at least part of it is expected to be cached in the page cache and can be readily transferred to the server. Therefore, the preferred embodiment of the present invention is implemented is a stackable file system but could just as well be a block-level implementation.

In a preferred embodiment of the present invention, the stackable file system can use (1) standard NFS or CIFS servers for backup purposes or (2) specialized CDP servers (e.g., same as used by Tivoli CDP).

In the first case, the remote file servers must be running versioning file systems 102 (e.g., ext3cow—Ext3cow or third extended file system with copy-on-write is an open source, versioning file system based on the ext3 file system. Versioning is implemented through block-level copy-on-write, giving ext3cow the "cow" in its name. Details on ext3cow's implementation can be found in Ext3cow: A Time-Shifting File System for Regulatory Compliance at http://hssl.cs.jhu.edu/papers/peterson-tos05.pdf) to support versioning of the data. Also, it is necessary to implement a special mechanism to allow remote clients to request particular versions of a file from the versioning file system. Note that it is also possible to run a stackable versioning file system on the clients. This implementation allows the system to use existing file servers (e.g., NFS or CIFS servers) 104 without any modifications but is expected to have poor performance.

In the second case, it is necessary to design a network file system to communicate with the CDP servers.

Figure 1B:
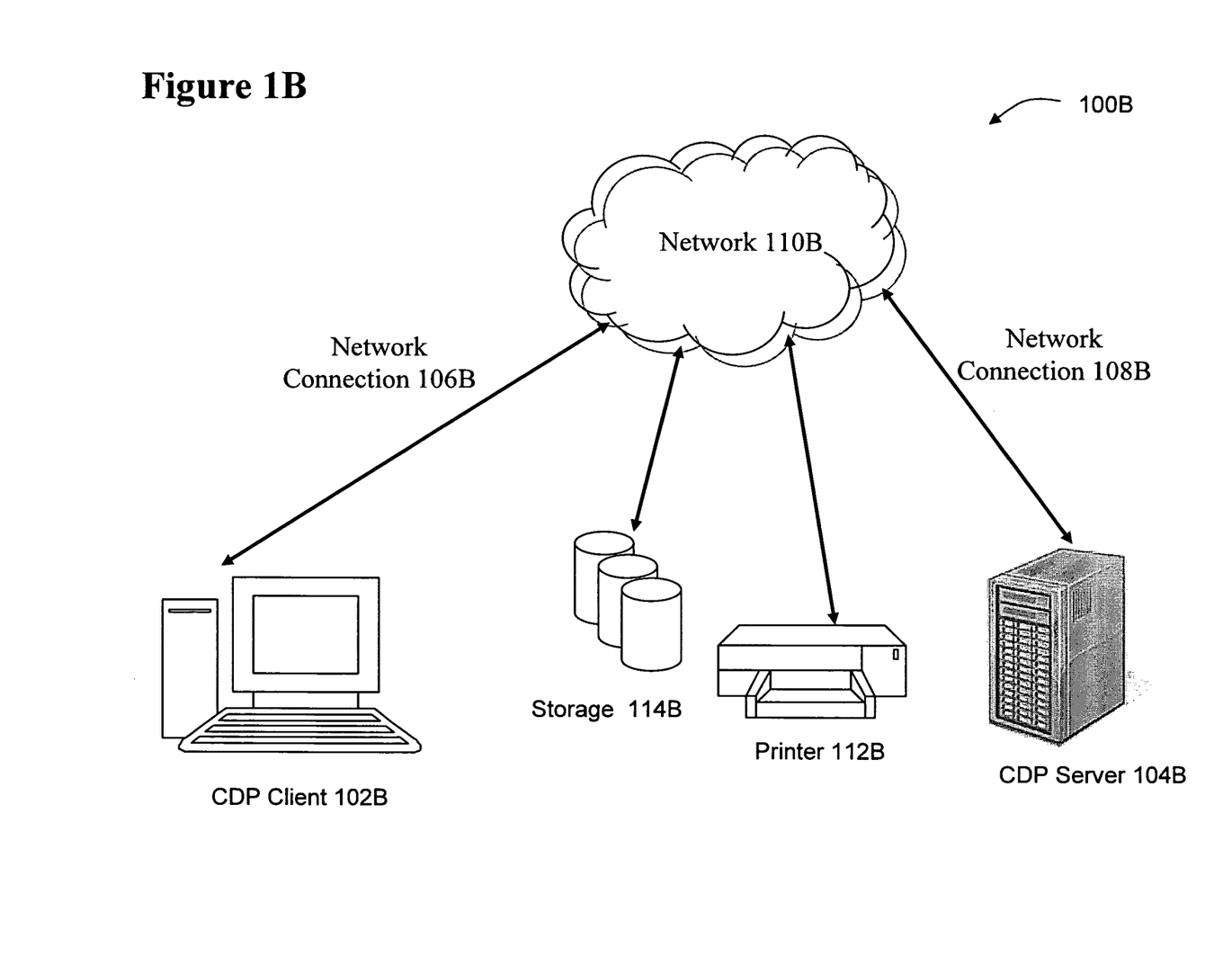
FIG. 1B shows an illustrative networking configuration in which the present invention may be implemented.
Figure 2:
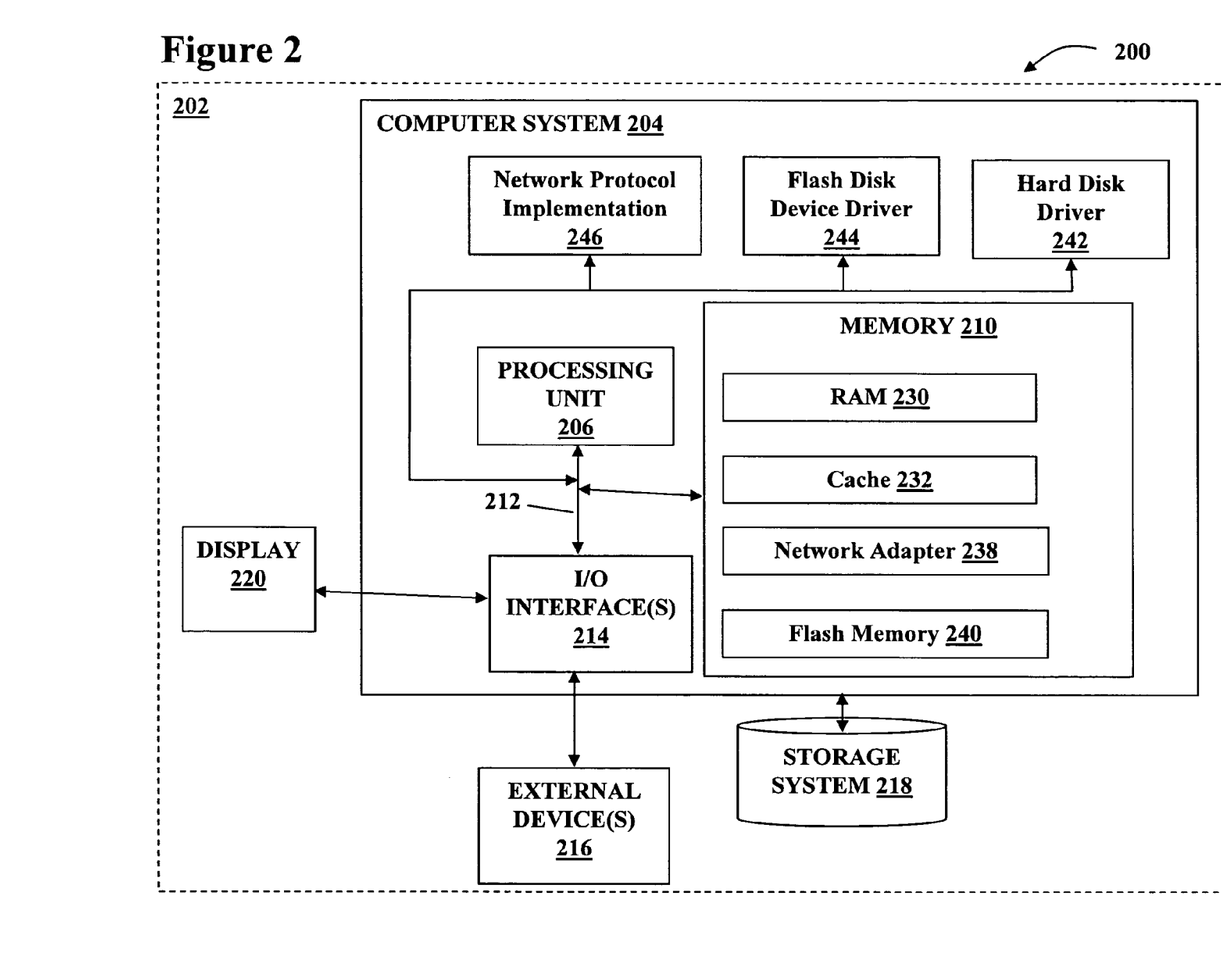
FIG. 2 shows an illustrative embodiment of a CPD client in accordance with the present invention.

As noted above, FIG. 1A and FIG. 1B show the architecture of the preferred embodiment of the system of the present invention. It is further described starting from the clients (desktops, notebooks, servers) (FIG. 2). As shown in FIG. 1B in CDP system 100B, CDP client 102B is coupled to network 110B to enable CDP client 102B to become coupled to CDP server 104B for uploading, e.g., updated data or, alternatively, to remote printers (printer 112B) or storage devices (storage 114B) through intervening private or public networks (network 110B). (A computer network is composed of multiple computers connected together using a telecommunication system for the purpose of sharing data, resources and communication. For more information, see http://historyoftheinternet.org/). Modems, cable modem and Ethernet cards are just a few of the currently available types of network adapters. (A network card, network adapter or NIC (network interface card) is a piece of computer hardware designed to allow computers to communicate over a computer network. It is both an OSI layer 1 (physical layer) and layer 2 (data link layer) device, as it provides physical access to a networking medium and provides a low-level addressing system through the use of MAC addresses. It allows users to connect to each other either by using cables or wirelessly). Sometimes, however, the network fails or is overloaded with peak traffic such that the data cannot be uploaded to the CDP Server 104B. As such, CDP client 102B needs to utilize the method of the present invention shown in FIG. 3A and FIG. 3B.

As shown in FIG. 2, the CDP client 200 is a file system that performs run-time backup. As with many data processing systems, CDP client 200 is suitable for storing and/or executing program code will include at least one processor (processing unit 206) coupled directly or indirectly to memory elements through a system bus. The memory elements can include local memory (RAM 230) employed during actual execution of the program code, bulk storage (storage 218), and cache memories (cache 232) which provide temporary storage of at least some program code in order to reduce the number of times code must be retrieved from bulk storage during execution. Input/output or I/O devices (external devices 216) (including but not limited to keyboards, displays, pointing devices, etc.) can be coupled to the system either directly or through intervening I/O controllers (I/O Interface 214). CDP client 200 further has flash memory 240.

CDP client 200 is designed in a hierarchical way: flash memory 240 serves as a buffer that keeps data updates (potentially with their versions) when the remote CDP server 104B is unavailable. In other words, the combination of the flash layer 240 and the remote server 104B contain all the data necessary to recover any file or any file version at any time. Once network connectivity (e.g., 106B and/or 108B) is reestablished collected data is submitted to the remote server 104B.

Flash layer 240 usually has a limited capacity and is used for both keeping data updates and most recent version of the frequently accessed files to improve performance. Therefore, in case of CDP, all versions except the latest one get discarded from the flash layer 240 after they are stored on the server. If a client 200 (102B) is connected to the server 104B, the least frequently accessed data is replaced with more frequently accessed for improved performance. In case of disconnected operation, previous versions of data are discarded so that the latest versions may be stored. Once all such data is discarded, if more space is need, similar data versions of the same files are discarded. The system of the present invention operates at the file system layer so extra policies can be added based on the importance of particular files or directories. Once all past versions of the files are discarded and there still not enough space left to save the new updates, the system of the present invention either declares file system full to the user or can start discarding the least important file copies.

To protect the flash layer from wearing out, the data does not have to be written to the flash layer when the network connectivity is available but rather submitted directly to the backup server.

It should be understood that the present invention is typically computer-implemented via hardware and/or software. As such, and client systems and/or servers will include computerized components as known in the art. Such components typically include (among others), a processing unit, a memory, a bus, input/output (I/O) interfaces, external devices, etc. It should also be understood that although a specific embodiment involving local flash memory and a remote server hybrid for continuous data protection has been depicted and described, the present invention could be implemented in conjunction with any type of backup server.

While shown and described herein as a system and method for utilizing local flash memory and a remote server for continuous data protection, it is understood that the invention further provides various alternative embodiments. For example, in one embodiment, the invention provides a computer-readable/useable medium that includes computer program code to enable a computer infrastructure to utilize local flash memory and a remote server for continuous data protection. To this extent, the computer-readable/useable medium includes program code that implements each of the various process steps of the invention. It is understood that the terms computer-readable medium or computer useable medium comprises one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory and/or storage system (e.g., a fixed disk, a read-only memory, a random access memory, a cache memory, etc.), and/or as a data signal (e.g., a propagated signal) traveling over a network (e.g., during a wired/wireless electronic distribution of the program code).

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

I claim:

1. A method for providing continuous data protection (CDP) in a system comprising at least one CDP client, at least one remote server having storage for storing backed up data from the at least one CDP client, and a network for connecting the at least one CDP client and the at least one remote server, the CDP client having local hard drive storage for storing data locally to the at least one CDP client and further having local flash memory for storing backup data locally to the at least one CDP client, the method, at the at least one CDP client, comprising the steps of:
  a. submitting updated data for writing to the local hard drive storage, the hard drive storage being a primary storage location;
  b. determining, in response to the submitting of the updated data, and before writing to the local hard drive storage, whether there is a network connection present between the CDP client and the remote server for transmitting the updated data from the CPD client to the remote server for backup purposes;
  c. if there is no network connection present, storing the updated data to the local flash memory, the local flash memory being a hardware component that is separate from the local hard drive that operates as a secondary storage location; and
  d. if there is a network connection present, sending the updated data to the remote server for backup purposes.

2. The method of claim 1 wherein the local flash memory is removable and wherein the local flash memory provides caching functions for local hard drive storage.

3. The method of claim 1 wherein step c, further comprises, prior to the storing of the updated data to the local flash memory, determining whether the local flash memory is full and, if not, storing the updated data to the local flash memory.

4. The method of claim 3 wherein step c further comprises: in response to a determination that the local flash memory is full, determining whether the local flash memory has a most recent version of the updated data and if not, writing new updates over older versions of the updated data.

5. The method of claim 3 wherein step c further comprises: in response to a determination that the local flash memory is full, determining whether the local flash memory has a most recent version of the updated data and if so, notifying a user that future data writes will not get backed up.

6. The method of claim 1 wherein step c further comprises: determining whether there is a network connection present between the CDP client and the remote server for transmitting the updated data from the local flash memory to the remote server for backup purposes and, if so, sending the updated data from the local flash memory to the remote server.

7. The method of claim 6 further comprising, after the sending the updated data from the local flash memory to the remote server clearing the local flash memory of the updated data.

8. A computer program product stored in a computer readable storage device for providing continuous data protection (CDP), that, when executed on a computer device, performs a method comprising the steps of:
  a. submitting updated data for writing to a local hard drive storage on a CDP client;
  b. determining, in response to the submitting of the updated data, and before writing to the local hard drive storage on the CDP client, whether there is a network connection present between the CDP client and a remote server for transmitting the updated data from the CPD client to the remote server for backup purposes;
  c. if there is no network connection present, storing the updated data to a local flash memory, the local flash memory being a hardware component that is separate from the local hard drive that operates as a secondary storage location; and
  d. if there is a network connection present, sending the updated data to the remote server for backup purposes.

9. The computer program product of claim 8 wherein the local flash memory is removable and wherein the local flash memory provides caching functions for local hard drive storage.

10. The computer program product of claim 8 wherein step c, further comprises, prior to the storing of the updated data to the local flash memory, determining whether the local flash memory is full and, if not, storing the updated data to the local flash memory.

11. The computer program product of claim 10 wherein step c further comprises: in response to a determination that the local flash memory is full, determining whether the local flash memory has a most recent version of the updated data and if not, writing new updates over older versions of the updated data.

12. The computer program product of claim 10 wherein step c further comprises: in response to a determination that the local flash memory is full, determining whether the local flash memory has a most recent version of the updated data and if so, notifying a user that future data writes will not get backed up.

13. The computer program product of claim 8 wherein step c further comprises: determining whether there is a network connection present between the CDP client the remote server for transmitting the updated data from the local flash memory to the remote server for backup purposes and, if so, sending the updated data from the local flash memory to the remote server.

14. The computer program product of claim 8 wherein the method comprises, after the sending the updated data from the local flash memory to the remote server, clearing the local flash memory of the updated data.

15. A continuous data protection (CDP) client for providing continuous data protection comprising:
  a. a network I/O device for allowing the CDP client to communicate with a remote server over a network, the remote server having storage for storing updated data from the CDP client, and for determining, in response to submitting of updated data, and before writing, whether there is a network connection present between the CDP client and the remote server for sending the updated data from the CPD client to the remote server for backup purposes;

b. a CPU for controlling the CDP client;

c. local hard drive storage for storing the updated data locally to the CDP client independent of whether the network I/O device determines that there is a network connection present between the CDP client and the remote server, the hard drive storage being a primary storage location;

d. local flash memory for storing updated data locally to the CDP client in response to the network I/O device determining that there is a network connection present between the CDP client and the remote server for sending the updated data to the remote server, the local flash memory being a hardware component that is separate from the local hard drive that operates as a secondary storage location, and wherein the network I/O device sends the updated data from the CDP client to the remote server for backup purposes in response to determining that there is a network connection present between the CDP client and the remote server.

16. The client of claim 15 further comprising a virtual file system and a stackable file system connected to the virtual file system.

17. The client of claim 16 further comprising a versioning file system connected to the stackable file system for providing versioning for the local hard drive storage, the local flash memory and/or the remote server storage, a log-structured file system connected between the stackable file system and the flash memory and a network file system connected between the stackable file system and the network.

18. The client of claim 15 further comprising a local hard drive storage driver connected to the local hard drive storage, a flash memory driver connected to the flash memory and a network protocol implementation connected to the network I/O device.

* * * * *